US006968452B2

(12) United States Patent
Vorbach et al.

(10) Patent No.: US 6,968,452 B2
(45) Date of Patent: Nov. 22, 2005

(54) METHOD OF SELF-SYNCHRONIZATION OF CONFIGURABLE ELEMENTS OF A PROGRAMMABLE UNIT

(75) Inventors: Martin Vorbach, Karlsruhe (DE); Robert Münch, Karlsruhe (DE)

(73) Assignee: PACT XPP Technologies AG, Munich (DE)

(*) Notice: Subject to any disclaimer, the term of this patent is extended or adjusted under 35 U.S.C. 154(b) by 119 days.

(21) Appl. No.: 10/373,595

(22) Filed: Feb. 24, 2003

(65) Prior Publication Data

US 2004/0052130 A1 Mar. 18, 2004

Related U.S. Application Data

(60) Continuation of application No. 09/537,932, filed on Mar. 29, 2000, now Pat. No. 6,526,520, which is a division of application No. 08/946,812, filed on Oct. 8, 1997, now Pat. No. 6,081,903.

(30) Foreign Application Priority Data

Feb. 8, 1997 (DE) .......................................... 197 04 728

(51) Int. Cl.[7] ............................................. G06F 15/177
(52) U.S. Cl. ............................. 713/100; 713/1; 713/400
(58) Field of Search ........................... 713/1, 100, 400, 713/401, 500, 600

(56) References Cited

U.S. PATENT DOCUMENTS

| | | | |
|---|---|---|---|
| 2,067,477 A | 1/1937 | Cooper | |
| 3,242,998 A | 3/1966 | Gubbins | |
| 3,681,572 A | 8/1972 | Stevens | |
| 3,757,608 A | 9/1973 | Willner | |
| 3,855,577 A | 12/1974 | Vandierendonck | |
| 4,489,857 A | 12/1984 | Agrawak et al. | |
| 4,498,134 A | 2/1985 | Etchells et al. | |
| 4,566,102 A | 1/1986 | Hefner | |
| 4,591,979 A | 5/1986 | Iwashita | |

(Continued)

FOREIGN PATENT DOCUMENTS

| | | |
|---|---|---|
| DE | 42 21 278 | 1/1994 |
| DE | 4416881.0 | 11/1994 |
| DE | 38 55 673 | 11/1996 |
| DE | 196 54 593 | 7/1998 |
| DE | 19654595 | 7/1998 |
| DE | 19654846 | 7/1998 |
| DE | 197 04 044 | 8/1998 |

(Continued)

OTHER PUBLICATIONS

Villasenor, John, et al., "Configurable Computing." *Scientific American*, vol. 276, No. 6, Jun. 1997, pp. 66–71.
Villasenor, John, et al., "Configurable Computing Solutions for Automatic Target Recognition," *IEEE*, 1996 pp. 70–79.
Tau, Edward, et al., "A First Generation DPGA Implementation," *FDP'95*, pp. 138–143.
Athanas, Peter, et al., "IEEE Symposium on FPGAs For Custom Computing Machines," *IEEE Computer Society Press*, Apr. 19–21, 1995, pp. i–vii, 1–222.

(Continued)

*Primary Examiner*—Dennis M. Butler
(74) *Attorney, Agent, or Firm*—Kenyon & Kenyon (57) ABSTRACT

A method of synchronizing and reconfiguring configurable elements in a programmable unit is provided. A unit has a two- or multi-dimensional, programmable cell architecture (e.g., DFP, DPGA, etc.), and any configurable element can have access to a configuration register and a status register of the other configurable elements via an interconnection architecture and can thus have an active influence on their function and operation. By making synchronization the responsibility of each element, more synchronization tasks can be performed at the same time because independent elements no longer interfere with each other in accessing a central synchronization instance.

7 Claims, 2 Drawing Sheets

U.S. PATENT DOCUMENTS

| | | |
|---|---|---|
| 4,663,706 A | 5/1987 | James et al. |
| 4,682,284 A | 7/1987 | Schrofer |
| 4,706,216 A | 11/1987 | Carter |
| 4,720,780 A | 1/1988 | Dolecek |
| 4,739,474 A | 4/1988 | Holsztynski et al. |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,891,810 A | 1/1990 | de Corlieu et al. |
| 4,901,268 A | 2/1990 | Judd |
| 4,910,665 A | 3/1990 | Mattheyses et al. |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,047,924 A | 9/1991 | Matsubara et al. |
| 5,065,308 A | 11/1991 | Evans |
| 5,072,178 A | 12/1991 | Matsumoto |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,274,593 A | 12/1993 | Proebsting |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemney et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal Abbas et al. |
| 5,611,049 A | 3/1997 | Pitts |
| 5,617,547 A | 4/1997 | Feeney et al. |
| 5,625,806 A | 4/1997 | Kromer |
| 5,634,131 A | 5/1997 | Matter et al. |
| 5,649,176 A | 7/1997 | Selvidge et al. |
| 5,649,179 A | 7/1997 | Steenstra et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |
| 5,658,797 A | 8/1997 | Zandveld et al. |
| 5,659,797 A | 8/1997 | Zandveld et al. |
| 5,675,743 A | 10/1997 | Mavity |
| 5,680,583 A | 10/1997 | Kuijsten |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,742,180 A | 4/1998 | Detton |
| 5,748,872 A | 5/1998 | Norman |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Trimberger et al. |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |
| 5,802,290 A | 9/1998 | Casselman |
| 5,828,229 A | 10/1998 | Cliff et al. |

| | | |
|---|---|---|
| 5,828,858 A | 10/1998 | Athanas |
| 5,838,165 A | 11/1998 | Chatter |
| 5,844,888 A | 12/1998 | Markkula |
| 5,848,238 A | 12/1998 | Shimomura et al. |
| 5,854,918 A | 12/1998 | Baxter |
| 5,859,544 A | 1/1999 | Norman |
| 5,865,239 A | 2/1999 | Carr |
| 5,867,691 A * | 2/1999 | Shiraishi ................ 713/400 |
| 5,867,723 A | 2/1999 | Peters et al. |
| 5,884,075 A | 3/1999 | Hester et al. |
| 5,887,162 A | 3/1999 | Williams et al. |
| 5,887,165 A | 3/1999 | Martel et al. |
| 5,889,982 A | 3/1999 | Rodgers et al. |
| 5,892,370 A | 4/1999 | Eaton et al. |
| 5,892,961 A | 4/1999 | Trimberger et al. |
| 5,901,279 A | 5/1999 | Davis, III |
| 5,915,123 A | 6/1999 | Mirsky et al. |
| 5,924,119 A | 7/1999 | Sindhu et al. |
| 5,927,423 A | 7/1999 | Wada et al. |
| 5,933,642 A | 8/1999 | Baxter et al. |
| 5,936,424 A | 8/1999 | Young et al. |
| 5,943,242 A * | 8/1999 | Vorbach et al. ............ 716/17 |
| 5,956,518 A | 9/1999 | DeHon et al. |
| 5,965,518 A | 10/1999 | DeHon et al. |
| 5,966,534 A | 10/1999 | Cooke et al. |
| 5,970,254 A | 10/1999 | Cooke et al. |
| 5,978,260 A | 11/1999 | Trimberger et al. |
| 6,011,407 A | 1/2000 | New |
| 6,014,509 A | 1/2000 | Furtek et al. |
| 6,020,758 A | 2/2000 | Patel et al. |
| 6,021,490 A * | 2/2000 | Vorbach et al. ........... 713/100 |
| 6,023,564 A | 2/2000 | Trimberger |
| 6,023,742 A | 2/2000 | Ebeling et al. |
| 6,034,538 A | 3/2000 | Abramovici |
| 6,038,650 A * | 3/2000 | Vorbach et al. ........... 711/219 |
| 6,038,656 A | 3/2000 | Cummings et al. |
| 6,047,115 A | 4/2000 | Mohan et al. |
| 6,049,222 A | 4/2000 | Lawman |
| 6,052,773 A | 4/2000 | DeHon et al. |
| 6,054,873 A | 4/2000 | Laramie |
| 6,058,469 A | 5/2000 | Baxter |
| 6,081,903 A | 6/2000 | Vorbach et al. |
| 6,085,317 A | 7/2000 | Smith |
| 6,086,628 A | 7/2000 | Dave et al. |
| 6,088,795 A * | 7/2000 | Vorbach et al. ........... 713/100 |
| 6,092,174 A | 7/2000 | Roussakov |
| 6,105,105 A | 8/2000 | Trimberger et al. |
| 6,108,760 A | 8/2000 | Mirsky et al. |
| 6,119,181 A * | 9/2000 | Vorbach et al. ........... 710/100 |
| 6,122,719 A | 9/2000 | Mirsky et al. |
| 6,125,408 A | 9/2000 | McGee et al. |
| 6,127,908 A | 10/2000 | Bozler et al. |
| 6,150,837 A | 11/2000 | Beal et al. |
| 6,150,839 A | 11/2000 | New et al. |
| 6,172,520 B1 | 1/2001 | Lawman et al. |
| 6,173,434 B1 | 1/2001 | Wirthlin et al. |
| 6,202,182 B1 | 3/2001 | Abramovici et al. |
| 6,219,833 B1 | 4/2001 | Solomon et al. |
| 6,230,307 B1 | 5/2001 | Davis et al. |
| 6,240,502 B1 | 5/2001 | Panwar et al. |
| 6,243,808 B1 | 6/2001 | Wang |
| 6,260,179 B1 | 7/2001 | Ohsawa et al. |
| 6,263,430 B1 | 7/2001 | Trimberger et al. |
| 6,279,077 B1 | 8/2001 | Nasserbakht et al. |
| 6,282,627 B1 | 8/2001 | Wong et al. |
| 6,288,566 B1 | 9/2001 | Hanrahan et al. |
| 6,289,440 B1 | 9/2001 | Casselman |
| 6,298,472 B1 | 10/2001 | Phillips et al. |
| 6,311,200 B1 | 10/2001 | Hanrahan et al. |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,370,596 B1 | 4/2002 | Dakhil |
| 6,378,068 B1 | 4/2002 | Foster et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,404,224 B1 | 6/2002 | Azegami et al. |
| 6,405,299 B1 * | 6/2002 | Vorbach et al. ................ 712/11 |
| 6,421,817 B1 | 7/2002 | Mohan et al. |
| 6,425,068 B1 * | 7/2002 | Vorbach et al. ................ 712/18 |
| 6,457,116 B1 | 9/2002 | Mirsky et al. |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,496,971 B1 | 12/2002 | Lesea et al. |
| 6,513,077 B2 | 1/2003 | Vorbach et al. |
| 6,519,674 B1 | 2/2003 | Lam et al. |
| 6,526,520 B1 | 2/2003 | Vorbach et al. |
| 6,538,468 B1 | 3/2003 | Moore |
| 6,539,477 B1 | 3/2003 | Seawright |
| 6,542,998 B1 | 4/2003 | Vorbach et al. |
| 6,571,381 B1 | 5/2003 | Vorbach et al. |
| 6,587,939 B1 | 7/2003 | Takano |
| 6,657,457 B1 | 12/2003 | Hanrahan et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,717,436 B2 | 4/2004 | Kress et al. |
| 2002/0038414 A1 | 3/2002 | Taylor et al. |
| 2002/0143505 A1 | 10/2002 | Drusinsky |
| 2002/0144229 A1 | 10/2002 | Hanrahan |
| 2002/0165886 A1 | 11/2002 | Lam |
| 2003/0014743 A1 | 1/2003 | Cooke et al. |
| 2003/0046607 A1 | 3/2003 | Vorbach |
| 2003/0052711 A1 | 3/2003 | Taylor et al. |
| 2003/0055861 A1 | 3/2003 | Lai et al. |
| 2003/0056085 A1 | 3/2003 | Vorbach |
| 2003/0056091 A1 | 3/2003 | Greenberg |
| 2003/0056202 A1 | 3/2003 | Vorbach |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2004/0015899 A1 | 1/2004 | May et al. |
| 2004/0025005 A1 | 2/2004 | Vorbach et al. |

FOREIGN PATENT DOCUMENTS

| | | |
|---|---|---|
| DE | 19704728 | 8/1998 |
| DE | 197 04 742 | 9/1998 |
| DE | 19651075 | 10/1998 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 6/1986 |
| EP | 0 221 360 | 5/1987 |
| EP | 0428327 A1 | 5/1991 |
| EP | 0 463 721 | 5/1991 |
| EP | 0748051 A2 | 12/1991 |
| EP | 0 477 809 | 4/1992 |
| EP | 0 485 690 | 5/1992 |
| EP | 0 497 029 | 8/1992 |
| EP | 0539595 A1 | 5/1993 |
| EP | 0 628 917 | 12/1994 |
| EP | 0 678 985 | 10/1995 |

| | | |
|---|---|---|
| EP | 0 686 915 | 12/1995 |
| EP | 0 726 532 | 8/1996 |
| EP | 735 685 | 10/1996 |
| EP | 0835685 | 10/1996 |
| EP | 0 926 594 | 6/1999 |
| EP | 1 102 674 | 7/1999 |
| EP | 726532 | 8/2000 |
| EP | 1 146 432 | 10/2001 |
| FR | 2 752 466 | 8/1996 |
| WO | A9004835 | 5/1990 |
| WO | WO90/11648 | 10/1990 |
| WO | A9311503 | 6/1993 |
| WO | WO94/06077 | 3/1994 |
| WO | 94/08399 | 4/1994 |
| WO | 95/00161 | 1/1995 |
| WO | 95/26001 | 9/1995 |
| WO | 0707269 A | 4/1996 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35299 | 8/1998 |
| WO | WO99/00731 | 1/1999 |
| WO | WO99/00739 | 1/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/77652 | 12/2000 |
| WO | WO02/13000 | 2/2002 |
| WO | WO02/21010 | 3/2002 |
| WO | WO02/29600 | 4/2002 |
| WO | WO02/71248 | 9/2002 |
| WO | WO02/71249 | 9/2002 |
| WO | WO02/103532 | 12/2002 |
| WO | WO03/17095 | 2/2003 |
| WO | WO03/23616 | 3/2003 |
| WO | WO03/25781 | 3/2003 |
| WO | WO03/32975 | 4/2003 |
| WO | WO03/36507 | 5/2003 |

OTHER PUBLICATIONS

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Norman, Richard S., Hyperchip Business Summary, The Opportunity, Jan. 31, 2000, pp. 1–3.

Maxfield, C. "Logic that Mutates While–U–Wait" EDN (Bur. Ed) (USA), EDN (European Edition), 7 Nov. 1996, Cahners Publishing, USA.

Arabi et al., "PLD Integrates Dedicated High–speed Data Buffering, Complex State Machine, and Fast Decode Array," conference record on WESCON'93, Sep. 28, 1993, pp. 432–436.

Ade et al., "Minimum Memory Buffers in DSP Applications," Electronics Letters, vol. 30, No. 6, Mar. 17, 1994, pp. 469–471.

Ferrante J. et al., "The Program Dependence Graph and its Use in Optimization ACM Transactions on Programming Languages and Systems," Jul. 1987, USA, [online] Bd. 9, Nr., 3, pp. 319–349, XP002156651 ISSN: 0164–0935 ACM Digital Library.

Hwang L. et al., "Min–cut Replication to Partitioned Networks" IEEE Transactions on Computer–Aided Design of Integrated Circuits and Systems, [online] Bd. 14, Nr. 1, Jan. 1995, pp. 96–106, XP00053228 USA ISSN: 0278–0070 IEEE Xplore.

Baumgarte, V., et al., PACT XPP "A Self–reconfigurable Data Processing Architecture," PACT Info. GMBH, Munchen Germany 2001.

Jantsch, Axel et al., "A Case Study on Hardware/software Partitioning," Royal Institute of Technology, Kista, Sweden, Apr. 10, 1994 IEEE, pp. 111–118.

Becker, J. et al., "Parallelization in Co–complication for Configurable Accelerators—a Host/accelerator Partitioning Compilation Method," proceedings of Asia and South Pacific Design Automation Conference, Yokohama, Japan, Feb. 10–13, 1998.

Isshiki, Tsuyoshi et al., "Bit–Serial Pipeline Synthesis for Multi–FPGA Systems with C++ Design Capture," 1996 IEEE pp. 38–47.

Hammes, Jeff et al., "Cameron: High Level Language Compilation for Reconfigurable Systems," Department of Computer Science, Colorado State University, Conference on Parallel Architectures and Compilation Techniques, Oct. 12–16, 1999.

K. Wada et al., "A Performance Evaluation of Tree–based Coherent Distributed Shared Memory" Proceedings of the Pacific RIM Conference on Communications, Comput and Signal Processing, Victoria, May 19–21 1993.

Nilsson et al., "The Scalable Tree Protocol—A Cache Coherence Approaches for Large–Scale Multiprocessors" IEEE, pp. 498–506 Dec. 1992.

Wu et al., "A New Cache Directory Scheme", IEEE, pp 466–472, Jun. 1996.

Hauck "The Roles of FPGA's in Reprogrammable Systems," IEEE, Apr. 1998, pp. 615–638.

Wittig et al., "OneChip: An FPGA Processor with Reconfigurable Logic" IEEE, 1996 pp. 126–135.

Cadambi et al., "Managing Pipeline–reconfigurable FPGAs," ACM, 1998, pp. 55–64.

Hong Yu Xu et al., "Parallel QR Factorization on a Block Data Flow Architecture" Conference Proceeding Article, Mar. 1, 1992, pp. 332–336 XPO10255276, p. 333, Abstract 2.2, 2.3, 2.4—p. 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157–1666.

Weinhardt, M. "Compilation Methods for Structure–programmable Computers", dissertation, ISBN 3–89722–011–3, 1997.

Cardoso, J.M.P., "Compilation of Java™ Algorithms onto Reconfigurable Computing Systems with Exploitation of Operation–Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15th Annual International Symposium on Computer Architecture, May 30, 1988, pp. 252–260.

TMS320C54X DSP: CPU and Peripherals, Texas Instruments, 1996, pp. 6–26 to 6–46.

TMS320C54x DSP: Mnemonic Instruction Set, Texas Instruments, 1996, p. 4–64.

XLINX, "Logic Cell Array Families: XC4000, XC4000A and XC4000H", product description, pp. 2–7 to 2–15, Additional XC3000, XD31000 and XD3100A Data, pp. 8–16 and 9–14.

Miller, Michael J. et al., "High–Speed FIFOs Contend with Widely Differing Data Rates: Dual–port RAM Buffer and Dual–pointer System Provide Rapid, High–density Data Storage and Reduce Overhead", Computer Design, Sep. 1, 1985, pp. 83–86.

Forstner, Peter "Wer Zuerst Kommt, Mahlt Zuerst!: Teil 3: Einsatzgebiete und Anwendungsbeispiele von FIFO–Speichem", Elektronik, Aug. 2000, pp. 104–109.

John R. Hauser et al., "Garp: A MIPS Processor with a Reconfigurable Coprocessor", University of California, Berkeley, IEEE, 1997, pp. 12–21.

Jorg Donandt, "Improving Response Time of Programmable Logic Controllers by Use of a Boolean Coprocessor," AEG Research Institute Berlin, IEEE, 1989, pp. 4–167–4–169.

Alexandre F. Tenca et al., "A Variable Long–Precision Arithmetic Unit Design for Reconfigurable Coprocessor Architectures", University of California, Los Angeles, 1998, pp. 216–225.

Andreas Koch et al, "Practical Experiences with the SPARXIL Co–Processor", 1998, IEEE, pp. 394–398.

Gokhale M. B. et al., "Automatic Allocation of Arrays to Memories in FPGA processors with Multiple Memory Banks", Field–Programmable Custom Computing Machines, 1999, IEEE, pp. 63–67.

Christian Siemers, "Rechenfabrik Ansaetze Fuer Extrem Parallele Prozessoren", Verlag Heinze Heise GmbH., Hannover, DE No. 15, Jul. 16, 2001, pp. 170–179.

Pedro Diniz et al., "Automatic Synthesis of Data Storage and Control Structures for FPGA–based Computing Engines", 2000, IEEE, pp. 91–100.

Markus Weinhardt et al., "Pipeline Vectorization for Reconfigurable Systems", 1999, IEEE, pp. 52–60.

Lizy John et al., "A Dynamically Reconfigurable Interconnect for Array Processors", vol. 6, No. 1, Mar. 1998, IEEE, pp. 150–157.

Fineberg, Samuel et al., "Experimental Analysis of a Mixed–Mode Parallel Architecture Using Bitonic Sequence Sorting", vol. 11, No. 3, Mar. 1991, pp. 239–251.

Jacob, Jeffrey et al., "Memory Interfacing and Instruction Specification for Reconfigurable Processors", ACM 1999, pp. 145–154.

Ye, Z.A. et al., "A Compiler for a Processor with a Reconfigurable Functional Unit," FPGA 2000 ACM/SIGNA International Symposium on Field Programmable Gate Arrays, Monterey, CA Feb. 9–11, 2000, pp. 95–100.

Ling, X., "WASMII: An MPLD with Data–Driven Control on a Virtual Hardware," Journal of Supercomputing, Kluwer Academic Publishers, Dordrect, Netherlands, 1995, pp. 253–276.

Villasensor, J. et al., "Express Letters Video Communications Using Rapidly Reconfigurable Hardware," IEEE Transactions on Circuits and Systems for Video Technology, IEEE, Inc. NY, Dec. 1995, pp. 565–567.

Hedge, S.J., 3D WASP Devices for On–Line Signal and Data Processing, 1994, International Conference on Wafer Scale Integration, pp. 11–21.

Iseli, C., et al. "A C++ Compiler for FPGA Custom Execution Units Synthesis," IEEE. 1995, pp. 173–179.

Alippi, C., et al., Determining the Optimum Extended Instruction Set Architecture for Application Specific Reconfigurable VLIW CPUs, IEEE., 2001, pp. 50–56.

Dutt, Nikil et al., "If Software is King for Systems–on–Silicon, What's New in Compiler," IEEE., 1997, pp. 322–325.

Piotrowski, Anton, "IEC–BUS, Die Funktionsweise des IEC–Bus und seine Anwendung in Geräten und Systemen", 1987, Franzis–Verlag GmbH, München, pp. 20–25.

Zhang, N. Et al., Architectural Evaluation of Flexible Digital Signal Processing for Wireless Receivers, Signals, Systems and Computers, 2000; Conference Record of the Thirty–Fourth Asilomar Conference, Bd.1, Oct. 29, 2000, pp. 78–83.

Fornaciari, W. Et al., System–level power evaluation metrics, 1997 Proceedings of the 2nd Annual IEEE International Conference on Innovative Systems in Silicon, New York, NY, Oct. 1997, pp. 323–330.

Schmit, H. Et al., Hidden Markov Modeling and Fuzzy Controllers in FPGAs, FPGAs for Custom Computing Mechined, 1995; Proceedings, IEEE Symposium on Napa Valley, CA, Apr. 1995, pp. 214–221.

Simunic, T. Et al., Source Code Optimization and Profiling of Energy Consumation in Embedded Systems, Proceedings of the 13th International Symposium on System Synthesis, Sep. 2000, pp. 193–198.

The XPP White Paper, Release 2.1, PACT—A Technical Perspective, Mar. 27, 2002, pp. 1–27.

Callahan, T. et al. "The Garp Architerchture and C Copiler," Computer, Apr. 2000, pp. 62–69.

Athanas P. "A Functional Reconfigurable Architecture and Compiler for Adoptive Computing,", IEEE, pp. 49–55.

* cited by examiner

METHOD OF SELF-SYNCHRONIZATION OF CONFIGURABLE ELEMENTS OF A PROGRAMMABLE UNIT

CROSS REFERENCE TO RELATED APPLICATION

This application is a continuation of U.S. patent application Ser. No. 09/537,932, filed Mar. 29, 2000, now U.S. Pat. No. 6,526,520 which is a division of U.S. patent application Ser. No. 08/946,812 filed on Oct. 8, 1997, now issued as U.S. Pat. No. 6,081,903, which is expressly incorporated herewith by reference in its entirety. This application also claims the benefit of the priority date of DE 19704728.9, filed on Feb. 8, 1997, under 35 U.S.C. §119.

1. BACKGROUND OF THE INVENTION

1.1 State of the Art
1.2 Problems

With the units of today (FPGAS, DPGAs, etc.), synchronization of the configurable elements is usually based on the clock pulse of the unit. This type of time-controlled synchronization poses many problems, because it is often not known in advance how much time a task will require until a final result is available. Another problem with time-controlled synchronization is that the event upon which the synchronization occurs is not triggered by the element to be synchronized itself but instead by an independent element. In this case, two different elements are involved in the synchronization. This leads to much higher management overhead.

1.3 Improvement Through the Invention

This invention describes a method which makes it possible for the synchronization to be based on the elements to be synchronized themselves. Synchronization is no longer implemented or administered by a central instance. By making synchronization the responsibility of each element, many more synchronization tasks can be carried out at the same time, because independent elements no longer interfere with each other in accessing the central synchronization instance. The patent claims concern details and specific embodiments as well as features of the synchronization method according to this invention.

2. Description of the Invention

2.1 Overview of the Invention; Abstract

In a unit with a two- or multi-dimensional, programmable cell architecture (DFP, DPGA), any configurable element can have access to the configuration and status register of the other configurable elements via an interconnection architecture and can thus have an active influence on their function and operation. Thus, in addition to the usual method, the configuration may also take place from the processing array (PA, see PACT02) through a primary logic unit.

2.2 Detailed Description of the Invention

The invention starts with a run-time programmable, run-time reconfigurable unit. The configurable elements on the chip have one or more configuration registers for different tasks. Read and write access to these configuration registers is possible. In the method described here, it is assumed that for the following information, a configuration can be set in an element to be configured.

Interconnection register. The type of connection with other cells is set in this register.

Command register. The function to be carried out by the configurable element is entered in this register.

Status register. The cell stores its current status in this register. This status provides information to the other elements of the component regarding which processing cycle the cell is in.

A cell is configured by a command which determines the function of the cell that is to be carried out. In addition, configuration data are entered to set the interconnection with other cells and the contents of the status register. The cell is ready for operation after this procedure.

To permit a flexible and dynamic interaction of multiple cells, each cell can have read or write access to all the configuration registers of another cell. The type of command with which the cell has been configured specifies to which of the many configuration registers will allow read or write access. Each command that can be executed by the cell exists in as many different modes of address as there are different independent configuration registers in an element to be configured.

Example: One cell has the configuration registers indicated above (interconnection, command and status) and is to execute the command ADD which performs addition. Through the various types of ADD command, it is now possible to select where the result of this function is to be transferred.

ADD-A. The result is transmitted to operand register A of the target cell.

ADD-B. The result is transmitted to operand register B of the target cell.

ADD-V. The result is transmitted to the interconnect register of the target cell.

ADD-S. The result is transmitted to the status register of the target cell.

ADD-C. The result is transmitted to the command register of the target cell.

In addition to the result, each cell can generate a number of trigger signals. The trigger signals need not necessarily be transmitted to the same target cell as the result of processing the configured command. One trigger signal or a combination of multiple trigger signals triggers a certain action in the target cell or puts the cell in a certain status. A description of the states can be found in the following text. There are the following trigger signals:

GO trigger. The GO trigger puts the target cell in the READY status.

RECONFIG trigger. The RECONFIG trigger sets the target cell in the RECONFIG status, so that the cell can be reprogrammed. This trigger is very appropriate especially in conjunction with switching tables. If it is assumed that the data to be processed is loaded into the operand registers at the rising edge of the clock pulse, processed in the period of the H level, and written to the output register at the trailing edge, then reconfiguration of the cell is possible at the trailing edge. The new configuration data is written to the command register at the trailing edge. The period of the L level is sufficient to successfully conclude the reconfiguration.

STEP trigger. The STEP trigger triggers a single execution of the configured command by the target cell that is in the WAIT status.

STOP trigger. The STOP trigger stops the target cell by setting the cell in the STOP status.

Due to the possibility of indicating in the processing cell in which register of the target cell the result is to be entered and which type of trigger signal is to be generated, a quantity of management data can be generated from a data stream.

This management data is not a result of the actual task to be processed by the chip, but instead serves only the function of management, synchronization, optimization, etc. of the internal status.

Each cell can assume the following states, which are represented by appropriate coding in the status register:

READY. The cell has been configured with a valid command and can process data. Processing takes place with each clock cycle. The data is entered into the register of the target cell on the basis of the addressing type of the cell sending the data.

WAIT. The cell has been configured with a valid command and can process data. Processing takes place in part on the basis of a trigger signal which can be generated by other elements of the unit. The data is entered into the register of the target cell on the basis of the addressing type of the cell sending the data.

CONFIG. The cell has not been configured with a valid command. The data packet which is sent to the cell with the next clock cycle is entered into the command register. The data packet is in any case entered into the command register, regardless of which addressing type has been used by the cell sending the data.

CONFIG WAIT. The cell has not been configured with a valid command. A data packet is entered with the next trigger signal which can be generated by other elements of the unit and can be written to the command register. The data packet is entered into the command register in any case, regardless of which addressing type has been used by the cell sending the data.

RECONFIG. The cell has been configured with a valid command, but it is not processing any data at the moment. The data is accepted by the cell (transferred to the input register) but is not processed further.

STOP. The cell is configured with a valid command, processed, but no data so far. The data is received by the cell (transmitted to the input register) but not further processed.

Due to these various states and the possibility of read and write access to the various registers of a cell, each cell can assume an active management role. In contrast with that, all existing units of this type have a central management instance which must always know and handle the overall status of the unit.

To achieve greater flexibility, there is another class of commands which change in type after the first execution. Using the example of the ADD command, the command has the following format:

ADD-C-A. The result of the ADD function is written to the command register of the target cell with the first execution of the command. With each subsequent execution, the result is written to operand register A.

This possibility can be expanded as much as desired, so that commands of the type ADD-C-V-A-C- . . . B are also conceivable. Each command can assume all permutated combinations of the different addressing and triggering types.

2.3 Hardware Expansion with Respect to PACT02

2.3.1 Additional Registers

A status register and a configuration register are added to the registers described in PACT02. Both registers are triggered by the PLU bus and they have a connection to the state machine of the SM UNIT (PACT02, FIG. 2: 0213).

2.3.2 Change in the PLU Bus

In PACT02, the configurable registers M/F-PLUREG are managed exclusively over the PLU bus (PACT02, FIG. 2: 0210). To ensure the function according to this invention, there must also be an additional possibility of access through the normal system bus (PACT02, FIG. 2: 0201). The same thing is true of the new status and configuration registers.

Only the part of the system bus that is interconnected with the PAE over the BM UNIT (PACT02, FIG. 2: 0210) is relevant for the registers. Therefore, the bus is relayed from the BM UNIT to the registers, where upstream multiplexers or upstream gates assume the switching between the PLU bus and the system bus relevant for the PAE.

The multiplexers or gates are wired so that they always switch through the system bus relevant for the PAE except after a reset of the unit (RESET) or when the ReConfig signal (PACT02, FIG. 3: 0306) is active.

2.3.3 Expansion of the System Bus

The system bus (PACT02, FIG. 2: 0201) is expanded to the extent that the information about the target register is transmitted together with the data. This means that an address which selects the desired register at the data receiver is also sent at the same time.

3. BRIEF DESCRIPTION OF THE DIAGRAMS

4. DETAILED DESCRIPTION OF THE DIAGRAMS AND EMBODIMENTS

Figure 1:
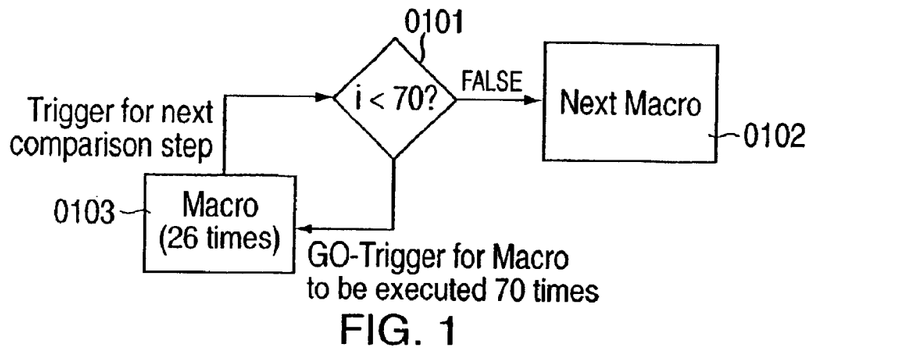
FIG. 1: This figure shows how a loop construct can be implemented by using triggers.

FIG. 1. Macro 0103 will be executed 70 times in this example. Execution of the macro once requires 26 clock cycles. This means that counter 0101 may be decremented by one only once in every 26 clock cycles. One problem with freely programmable units is that it is not always possible to guarantee that the execution of macro 0103 is actually concluded after 26 cycles. A delay can occur, for example, due to the fact that a macro which is supposed to deliver input data for macro 0103 suddenly needs ten clock cycles longer. For this reason, the cell in macro 0103 sends a trigger signal to counter 0101 by means of which the result of the computation is sent to another macro. At the same time, processing of macro 0103 is stopped by the same cell. This cell "knows" exactly that the condition for termination of a computation has been reached.

The trigger signal sent in this case is a STEP trigger which causes counter 0101 to execute its configured function once. The counter decrements its count by one and compares whether it has reached the value zero. If this is not the case, a GO trigger is sent to macro 0103. This GO trigger signal causes macro 0103 to resume its function again. This process is repeated until counter 0101 has reached a value of zero. In this case a trigger signal is sent to macro 0102, where it triggers a function.

A very fine-grained synchronization can be achieved by this interaction of triggers.

Figure 2:
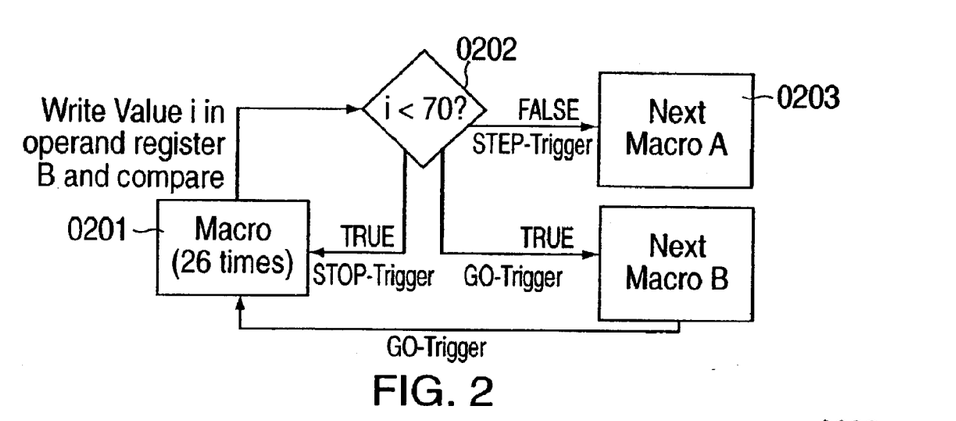
FIG. 2: This figure shows how a comparator construct can be implemented by using multiple triggers.

FIG. 2 corresponds to the basic idea of FIG. 1. However, in this case the function in element 0202 is not a counter but a comparator. Macro 0201 sends a comparison value to comparator 0202 after each processing run. Depending on the output of the comparison, different triggers are again activated to cause an action in macros 0203, for example. The construct implemented in FIG. 2 corresponds to that of an IF query in a program language.

Figure 3:
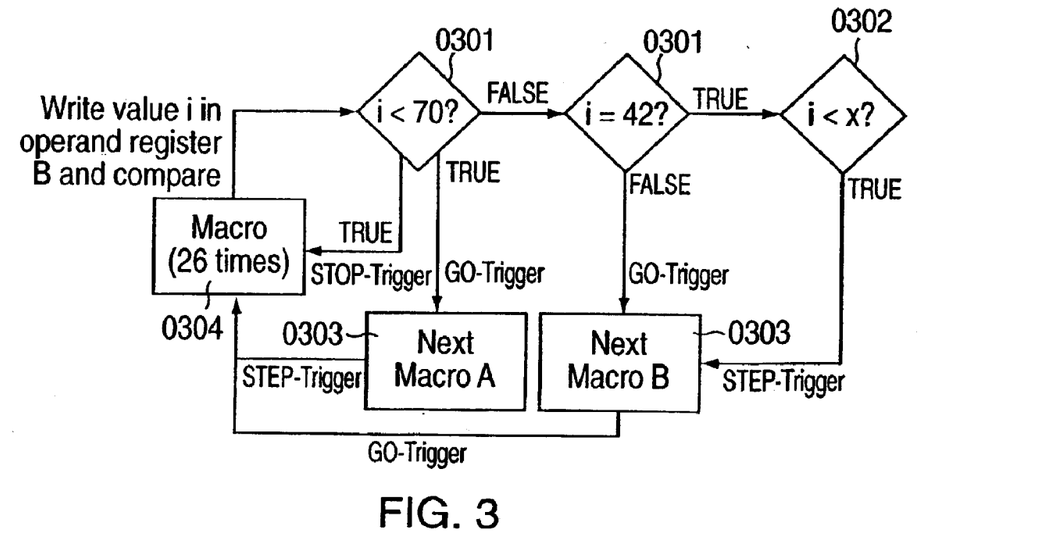
FIG. 3: This figure shows how a comparator construct with multiple outputs can be implemented by using multiple triggers and interleaving them.

FIG. 3. As in FIG. 2, several comparators 0301, 0302 are used here to implement the construction of an IF-ELSE-ELSE construct (or a multiple choice). By using various types of triggers and connections of these triggers to macros 0303, 0304, very complex sequences can be implemented easily.

Figure 4:
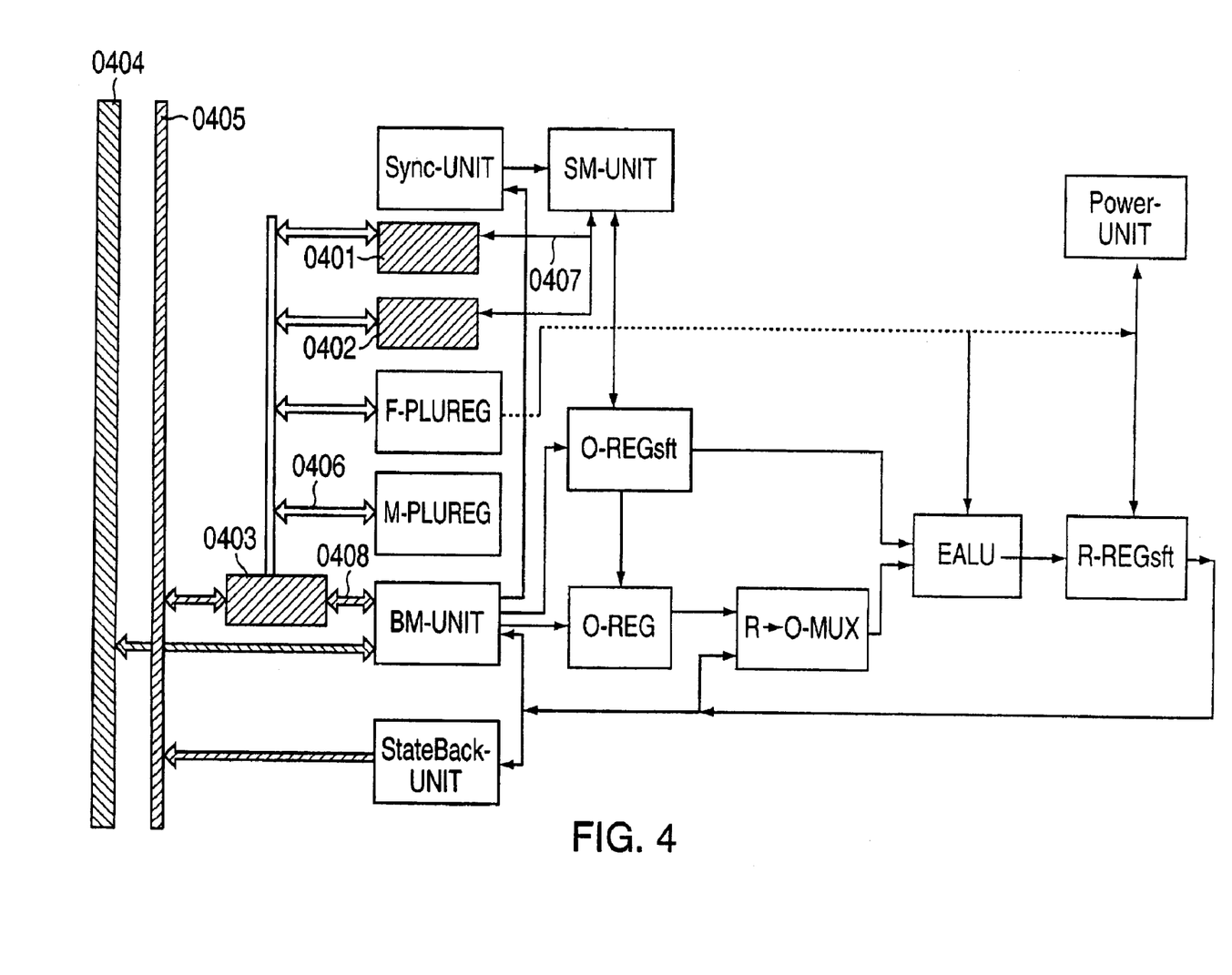
FIG. 4: This shows the required extensions in comparison with PACT02.

FIG. 4 shows the differences in comparison with PACT02 in FIG. 2. The differences are shown with shading. The configuration register (0401) and the status register (0402) are connected to the SM UNIT over the bus (0407). Registers 0401, 0402, F- and M-PLUREG are connected to a gate 0403 over an internal bus (0206) this connects the internal bus (0406) to the PLU bus 0405, depending on the setting, to permit configuration by the PLU, or to the BM UNIT over a bus 0408. Depending on the addressing on data bus 0404, the BM unit relays the data to the O-REG or to the addressed register 0401, 0402, F- or M-PLUREG.

6. Definition of Terms

BM UNIT: Unit for sending data on the bus systems outside the PAE. The data is sent over multiplexers for the data inputs and gates for the data outputs. oACK lines are implemented as open-collector drivers. The BM UNIT is controlled by the M-PLUREG.

Data receiver: The unit(s) that further process(es) the results of the PAE.

Data transmitter: The unit(s) that make(s) data available for the PAE as operands.

Data string: A data string consists of a bit sequence of any length. This bit sequence is a processing unit for a system. Commands for processors and similar units as well as strictly data can be coded in a data string.

DFP: Data flow processor according to (unexamined) German Patent DE 44 16 881.

DPGA: Dynamically programmable gate array. Known.

EALU: Expanded arithmetic and logic unit. An ALU that has been expanded by adding special functions that are needed or appropriate for operation of a data processing system according to German Patent DE 441 16 881 A1. These are counters in particular.

Elements: Collective term for all types of self-contained units which are used as one piece in an electronic unit. Elements are thus:

Configurable cells of all types
Clusters
RAM blocks
Logic units
ALUs
Registers
Multiplexers
I/O pins of a chip Event: An event can be analyzed by a hardware element in any appropriate manner for the application and it can trigger a conditional action as a response to this analysis. Events are thus, for example:

Clock cycle of a data processing system,
Internal or external interrupt signal,
Trigger signal from other elements within the unit,
Comparison of a data stream and/or a command stream with a value,
Input/output events,
Running, overrunning, resetting, etc. a counter,
Analysis of a comparison.

FPGA: Field-programmable gate array. Known.

F-PLUREG: Register in which the function of the PAEs is set. Likewise, the one-shot and sleep modes are set. The PLU writes into the register.

H level: Logic 1 level, depending on the technology used.

Configurable element: A configurable element is an element of a logic unit which can be set by a configuration string for a specific function. Configurable elements are thus all types of RAM cells, multiplexers, arithmetic and logic units, registers and all types of internal and external interconnection description, etc.

Configurable cell: See logic cells.

Configure: Setting the function and interconnection of a logic unit, a (FPGA) cell or a PAE (see reconfigure).

Configuration data: Any quantity of configuration strings.

Configuration memory: The configuration memory contains one or more configuration strings.

Configuration string: A configuration string consists of a bit sequence of any length. This bit sequence represents a valid setting for the element to be configured, so the result is a functional unit.

Primary logic unit: Unit for configuring and reconfiguring the PAE. Embodied by a microcontroller adapted specifically to its task.

Logic cells: Configurable cells used in DFPs, FPGAs, DPGAs which fulfill simple logical or arithmetic tasks according to their configuration.

L level: Logic 0 level, depending on the technology used.

M-PLUREG: Register in which the interconnection of the PAEs is set. The register is written by the PLU.

O-REG: Operand register for storing the operands of the EALU. Permits chronological and functional independence of the PAEs from the data transmitters. This simplifies the transfer of data because it can take place asynchronously or packet-oriented. At the same time, this creates the possibility of reconfiguring the data transmitters independently of the PAEs or reconfiguring the PAEs independently of the data transmitters.

PLU: Unit for configuring and reconfiguring the PAEs. Embodied by a microcontroller adapted specifically to its function.

SM UNIT: State machine UNIT. State machine that controls an EALU.

Switching table: A switching table is a ring memory which is addressed by a control. The entries in a switching table may contain any configuration strings. The control can execute commands. The switching table responds to trigger signals and reconfigures the configurable elements on the basis of an entry in a ring memory.

Reconfigure: Reconfiguring any quantity of PAEs while any remaining quantity of PAEs continue their own functions (see configure).

Processing cycle: A processing cycle describes the period of time needed by a unit to go from a defined and/or valid state to the next defined and/or valid state.

Cells: Synonym for configurable elements.

7. Conventions 7.1 Naming Conventions
Subassembly: UNIT
Operating mode:MODE
Multiplexer:MUX
Negated signal:not Register for PLU visible: PLUREG
Register internal:REG
Shift registers:sft 7.2 Function Convention AND function &

| A | B | Q |
|---|---|---|
| 0 | 0 | 0 |
| 0 | 1 | 0 |
| 1 | 0 | 0 |
| 1 | 1 | 1 |

OR function #

| A | B | Q |
|---|---|---|
| 0 | 0 | 0 |
| 0 | 1 | 1 |
| 1 | 0 | 1 |
| 1 | 1 | 1 |

NOT function !

| A | Q |
|---|---|
| 0 | 1 |
| 1 | 0 |

GATE function G

| EN | D | Q |
|----|---|---|
| 0  | 0 | — |
| 0  | 1 | — |
| 1  | 0 | 0 |
| 1  | 1 | 1 |

We claim:

1. A method of synchronizing and reconfiguring configurable elements in units having a multi-dimensional programmable cell architecture, comprising:

generating by at least one of the configurable elements at least one synchronization signal within a data stream during processing by the configurable elements;

transmitting via a data bus the at least one synchronization signal to a first at least one other of the configurable elements for synchronization;

generating at least one configuration string from the data stream based on commands; and transmitting via the data bus the at least one configuration string together with an address of a register to be addressed to at least one of (a) the first at least one other configurable element and (b) a second at least one other configurable element, wherein the configurable elements are at least one of configurable and reconfigurable without influence of an external primary logic unit.

2. The method according to claim 1, wherein, during the synchronization, a configurable element carries out a single operation in response to a trigger.

3. The method according to claim 1, wherein, during the synchronization, a configurable element carries out a plurality of synchronization operations in response to a trigger.

4. The method according to claim 1, wherein, during the synchronization, execution of an operation by a configurable element is stopped in response to a trigger.

5. The method according to claim 1, wherein, during the synchronization, a configurable element is enabled for reconfiguration by a trigger.

6. The method according to claim 1, wherein a configurable element displays its instantaneous status in a status register.

7. The method according to claim 1, wherein the address of the resister is coded in commands.

* * * * *

UNITED STATES PATENT AND TRADEMARK OFFICE
CERTIFICATE OF CORRECTION

PATENT NO.       : 6,968,452 B2                                         Page 1 of 1
APPLICATION NO. : 10/373595
DATED            : November 22, 2005
INVENTOR(S)      : Martin Vorbach et al.

It is certified that error appears in the above-identified patent and that said Letters Patent is hereby corrected as shown below:

Column 8, line 44, change "resister" to --register--.

Signed and Sealed this

Nineteenth Day of December, 2006

JON W. DUDAS
*Director of the United States Patent and Trademark Office*